INVENTORS
GEORGE T. MAHLER
ERWIN C. HANDWERK
BY
ATTORNEYS

Jan. 17, 1950 G. T. MAHLER ET AL 2,494,552
CONDENSING ZINC VAPOR
Original Filed March 11, 1948 4 Sheets-Sheet 2
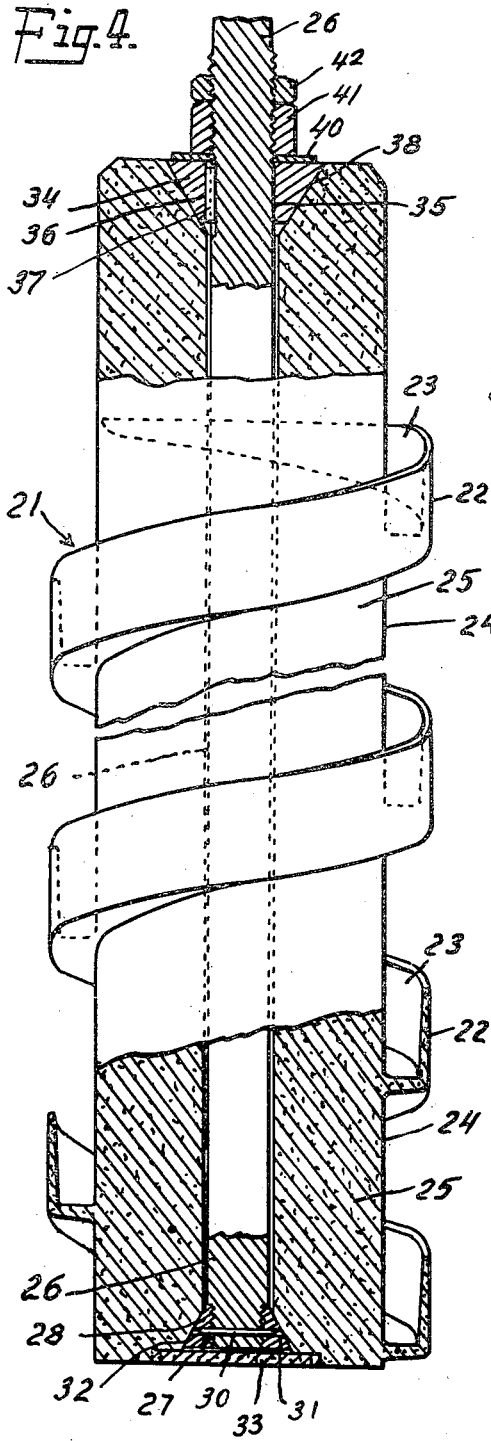
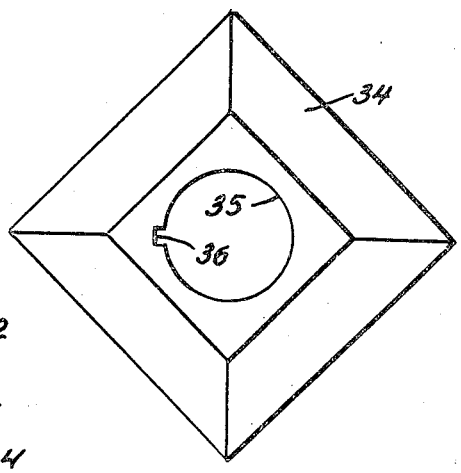
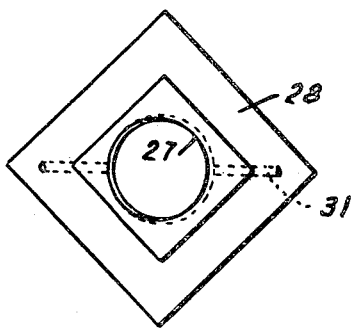
INVENTORS
GEORGE T. MAHLER
ERWIN C. HANDWERK
BY
ATTORNEYS

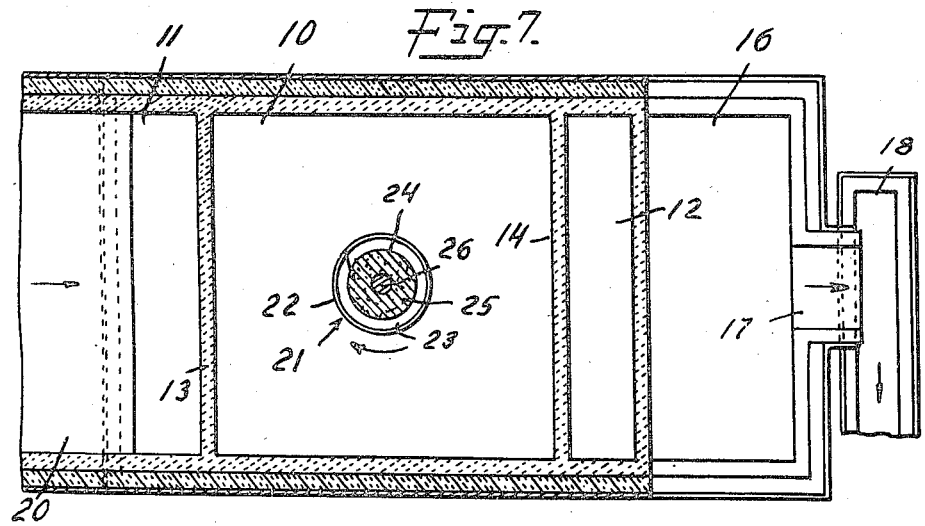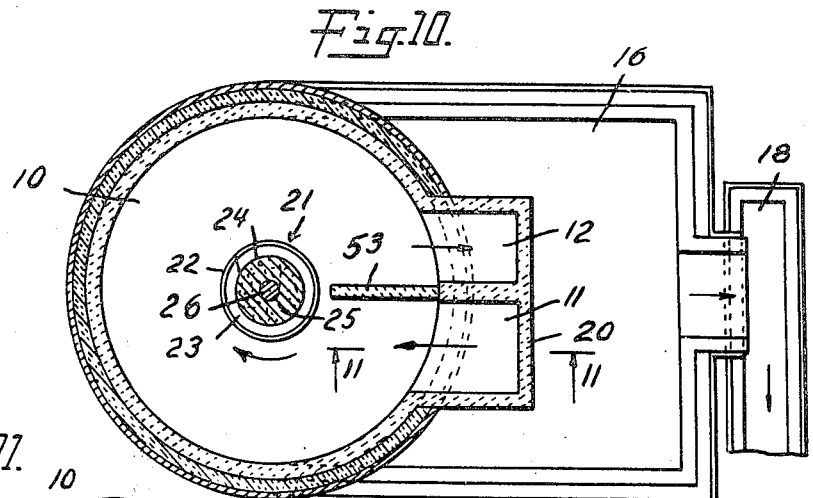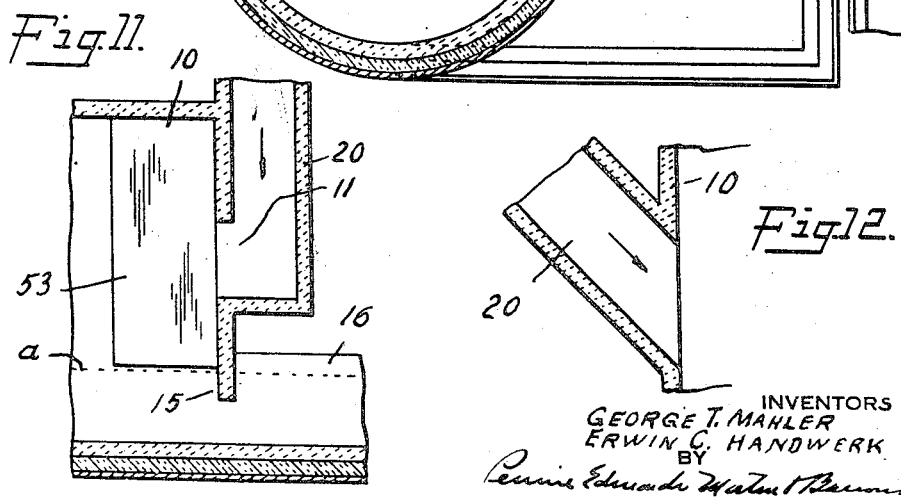

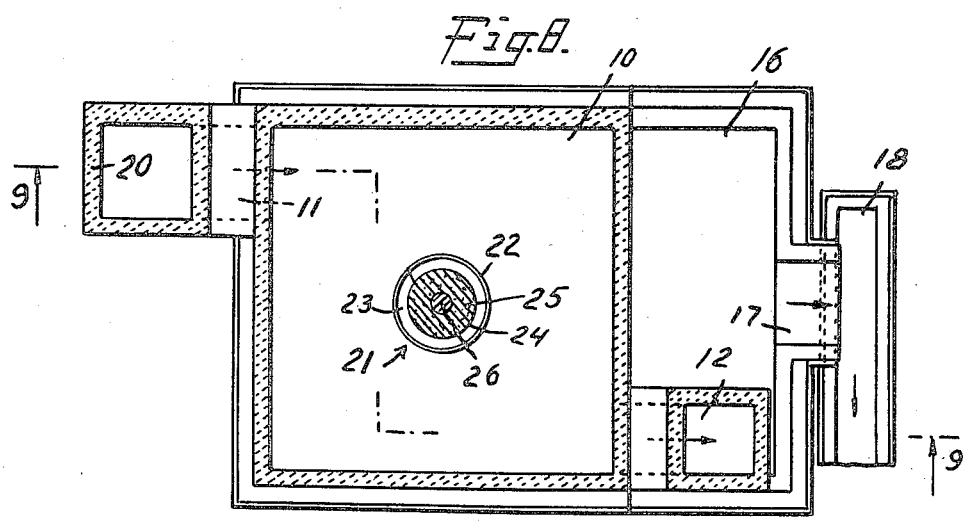
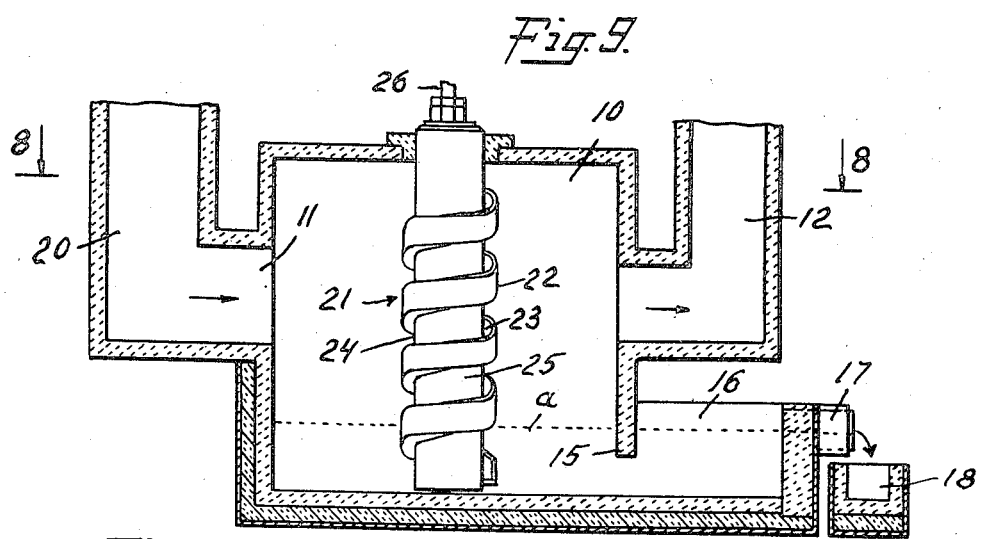
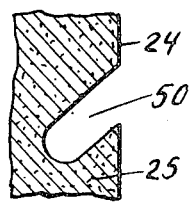
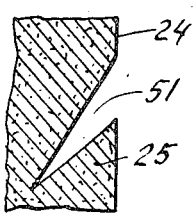
INVENTORS
GEORGE T. MAHLER
ERWIN C. HANDWERK
BY
ATTORNEYS Patented Jan. 17, 1950

2,494,552

UNITED STATES PATENT OFFICE 2,494,552

CONDENSING ZINC VAPOR

George T. Mahler, Palmerton, and Erwin C. Handwerk, Lehighton, Pa., assignors to The New Jersey Zinc Company, New York, N. Y., a corporation of New Jersey Original application March 11, 1948, Serial No. 14,286. Divided and this application November 19, 1948, Serial No. 60,922

6 Claims. (Cl. 266—15)

This invention relates to the condensation of zinc vapor and involves an improved apparatus for condensing zinc vapor.

The condensation of zinc vapor is beset by problems which are not encountered in the condensation of any other substance. Zinc vapor to be condensed is generally obtained in admixture with the gaseous products of a zinc smelting operation consisting largely of carbon monoxide at substantially the temperature prevailing in the zinc smelting operation. As the zinc vapor bearing gases are cooled in the course of condensation, carbon monoxide appears to undergo dissociation into carbon dioxide and carbon at approximately the boiling point temperature of zinc. Carbon dioxide at such an elevated temperature is an oxidizing agent for zinc. Accordingly, as the zinc vapor condenses into the initial form of droplets, there is a pronounced tendency for the surface of these droplets of molten metal to become oxidized by the carbon dioxide and to become further contaminated by the finely divided carbon produced by dissociation of the carbon monoxide. As a result, the surface of the droplets of molten zinc becomes so altered as to interfere with subsequent coalescence of the droplets to form a body of molten metal. The contaminated droplets remain in this form and solidify as dust-like particles known as blue powder. Blue powder is not ordinarily salable and must be returned to the smelting operation for remelting.

The production of blue powder may be minimized by rapid cooling of the zinc through the critical temperature range in which carbon monoxide dissociates and exists in equilibrium with carbon dioxide. Excessively rapid cooling of zinc vapor through this critical range leads, however, to increased production of zinc dust in a form known as "physical" blue powder. It is generally believed that physical blue powder is formed by cooling the zinc so rapidly that droplets of condensed molten zinc are chilled to the solid state before they have had an opportunity to coalesce and form a body of molten metal. It is apparent therefore that rapid cooling of zinc vapor in a condenser has certain limitations. The condensers used heretofore with modern externally-heated vertical zinc retorts, utilizing the most effective cooling rate and other condensing conditions, commonly produced blue powder or zinc dust amounting to about 7% to 15% of the zinc output.

The apparatus of the present invention makes possible the condensation of zinc vapor with the formation within the condensing chamber of a relatively negligible amount of blue powder, generally in the neighborhood of 1% or less. The apparatus is particularly adapted for condensing zinc vapor diluted with ordinary smelting gases such as carbon monoxide and the like, and is particularly adapted for use in condensing zinc vapor from the smelting of zinc by means of modern externally-heated vertical zinc retorts or electro-thermally heated retorts of large capacity.

The apparatus for condensing zinc vapor in accordance with the invention comprises a closed vessel or chamber having a zinc vapor inlet and a gas outlet. A screw lift is disposed vertically within the vessel and is provided with a retaining wall capable of permitting radial discharge therethrough of molten zinc raised by the lift. The screw lift is adapted when rotated to raise molten zinc from a body thereof in communication with the lower end of the lift. Means are provided for rotating the lift so as to raise molten zinc from the body thereof and throw the raised molten zinc into the vessel above the body of molten zinc therein.

The retaining wall of the screw lift is such as to cooperate with the screw lift to make possible the raising of molten zinc thereby and is also such as to permit radial discharge therethrough of molten metal raised by the lift. The retaining wall is thus provided with at least one opening communicating with the interior of the condensing vessel. For example, the retaining wall may be provided with a single spirally-shaped opening extending throughout a large portion of the length of the wall, or the wall may be provided with a plurality of longitudinal slots arranged at spaced intervals about the periphery of the wall. The retaining wall may or may not be integrally connected to the lift. Thus, the wall may comprise a stationary cylinder about the screw lift or it may be secured to the lift. The presently preferred embodiment of the screw lift and its retaining wall comprises a rotatable open-topped channel spirally disposed about a substantially vertical axis within the condensing vessel. The floor of the channel comprises the screw lift and its outer wall provides a retaining wall which cooperates with the lifting floor to raise molten zinc when the channel is rotated about its vertical axis. The spiral form of the retaining wall leaves between successive flights a corresponding spiral opening through which molten zinc may be discharged. Thus, the channel is adapted upon rotation to raise molten zinc from a body thereof in communication with the lower end of the channel, and means are provided for rotating the channel in such manner as to raise molten zinc from the body thereof and throw the raised molten zinc by centrifugal force from the open top of the channel (over the outer retaining wall) and into the condensing vessel above the body of molten zinc therein.

The foregoing and other novel features of the invention will be more fully understood from the following description taken in conjunction with the accompanying drawings in which Fig. 1 is a longitudinal sectional elevation of a condenser embodying the invention;

Fig. 4 is an elevation, partly in section, of a channel-shaped screw lift used in accordance with the invention;

Fig. 5 is a bottom plan view of a sliding coupling plug used to key the upper portion of the screw lift to its drive shaft;

Fig. 6 is a top plan view of a fixed coupling plug used to key the lower end of the screw lift to its drive shaft;

Fig. 7 is a sectional plan view of the condenser shown in Fig. 1 taken along line 7—7 therein;

Fig. 8 is a sectional plan view of another modification of the zinc condenser of the invention taken along line 8—8 in Fig. 9;

Fig. 9 is a sectional elevation taken along line 9—9 in Fig. 8;

Fig. 10 is a sectional plan view of another embodiment of the invention taken at substantially the same level as the plan shown in Fig. 8;

Fig. 11 is a fragmentary sectional elevation taken along line 11—11 in Fig. 10;

Fig. 12 is a modified form of zinc vapor inlet to the condenser in accordance with the invention; and Figs. 13 and 14 are partial sectional views of modifications of the screw lift in accordance with the invention.

Figure 1:
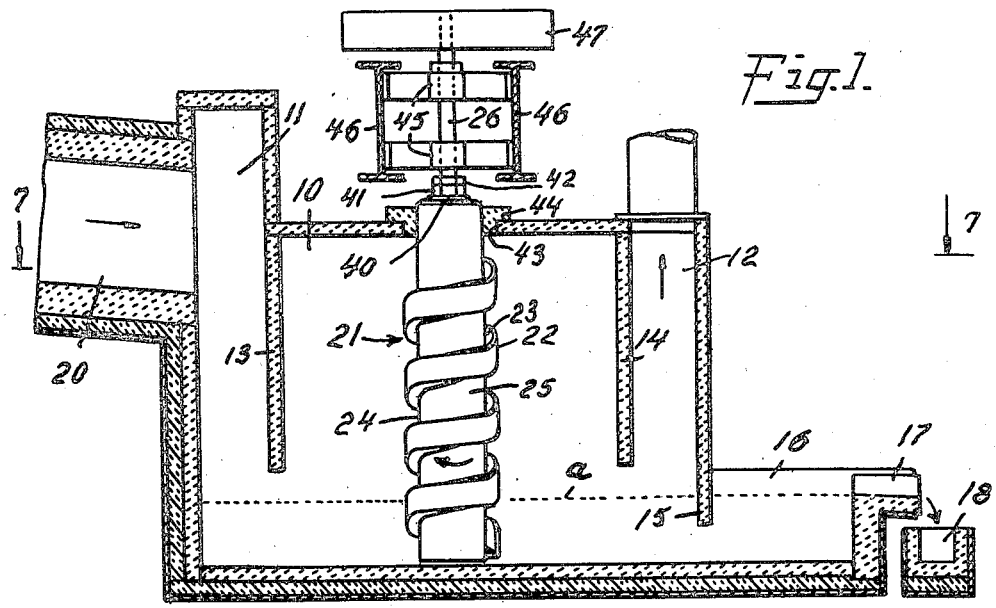

A zinc condenser embodying the invention may, as illustrated in Fig. 1, comprise a generally rectangular condensing chamber of vessel 10 having a zinc vapor inlet 11 approximate one end and a gas outlet 12 for exhaust or waste gases approximate its other end. The zinc vapor inlet 11 may be shielded by a depending refractory baffle 13 to prevent splashing of molten zinc into the inlet. The gas outlet 12 may similarly be provided with a depending refractory baffle 14 to prevent splashed zinc or zinc spray from being entrained with and carried away by the exhaust gases. The condensing chamber is lined with suitable refractory material and communicates, below the lower edge 15 of one end wall, with a discharge well 16 having an overflow spout 17. The level of the overflow spout 17 determines the level $a$ of the body of molten zinc in the condensing chamber. The lower edge 15 of the end wall extends below the level $a$ of molten metal and provides a seal between the condensing chamber and the open discharge well 16. Molten metal overflowing the spout 17 falls into the collecting trough 18 which conveys the molten metal to casting equipment or the like.

It will be seen, accordingly, that the zinc vapor bearing gases from the source thereof, introduced through a suitable pipe connection 20 into the inlet 11, flow under the baffle 13 into the interior of the condenser chamber 10 wherein the zinc vapor is condensed. The gases accompanying the incoming zinc vapor pass under the depending baffle 14 and are withdrawn through the gas outlet 12. Maintenance of the molten zinc level $a$ is insured by the overflow spout 17 so that a substantially constant volume of molten zinc is maintained within the condensing chamber. Molten zinc is thus continuously withdrawn from the condensing chamber at exactly the rate at which zinc vapor is condensed in the chamber to form molten zinc.

Condensation of zinc vapor within the chamber, in accordance with the invention, is promoted to an exceptional degree by means of a violent shower of molten zinc thrown into the chamber above the body of molten zinc therein from a plurality of points vertically distributed within the central portion of the chamber. The shower is produced by means of a vertically disposed screw lift 21 positioned within the chamber. The lift comprises advantageously an open-topped channel 22 spirally disposed about a substantially vertical axis within the condensing chamber. As shown more clearly in Fig. 4, the spiral channel 22 may be formed by machining such a channel in a single piece of graphite such as a graphite electrode of the type designed for an electric arc furnace. The channel is open on the top, as indicated at 23 in Fig. 4, and preferably takes the form of a spirally disposed channel arranged about the outer cylindrical surface 24 of a vertically disposed shaft-like body member 25. The channel preferably extends from the lower end of the body member to a point a substantial distance below the upper end of the body member for a reason which appears clearly hereinafter.

The shaft-like body member 25 of the screw lift is advantageously mounted on and supported by a metal drive shaft 26, rendered temperature resistant by water cooling or by construction of stainless steel or the like, which extends longitudinally along the axis of the body member. The lower end of the shaft 26 is threaded to engage the threaded interior 27 of a fixed coupling plug 28 which is shown in detail in Fig. 6. The plug 28 is preferably a tapered body having a substantially square cross section and resembling a truncated pyramid. The plug 28 is screwed onto the threaded end of the shaft 26 and is locked in place by a tapered pin 30 extending through a transverse opening 31 drilled through the plug. The plug is seated in an opening 32 of substantially complementary shape machined in the lower end of the graphite body member 25. The depth of the opening 32 is such that the plug 28 is countersunk therein. A circular cut is also made in the end of the graphite body member 25 of slightly greater diameter than the maximum cross sectional dimension of the plug 28 and as deep as the extent of countersinking of this plug in the end of the body member. The resulting space, after the plug has been secured in position, is filled with a graphite paste 33, or the like, in order to completely cover the metal plug 28 and prevent contamination of the molten zinc by this metal.

The upper end of the screw lift is similarly coupled to the drive shaft 26 by an upper metal plug 34. The plug 34 is provided with an unthreaded central opening 35 of sufficient size to permit the plug to slide freely along the shaft 26. The opening 35 is provided with a keyway 36 adapted to engage a key 37 mounted longitudinally along the surface of the shaft 26 adjacent the upper end of the graphite shaft-like body member 25. The plug 34 may thus be slid over the upper end of the shaft 26 and moved into place in a complementary-shaped opening 38 in the upper end of the body member 25. In this position, the plug becomes keyed to the screw lift and is also coupled to the shaft 26 by the key 37. The plug is held securely in position in the end of the lift by conventional means such as a washer 40, a nut 41 and a check nut 42 engaging threads on the shaft 26. As the nut 40 is tightened on the shaft, the two metal plugs 28 and 34 are forced toward one another and are firmly locked in coupling engagement within the ends of the screw lift. The two plugs are coupled to the shaft 26 by the tapered pin 30 in the lower plug 28 and by the key 37 engaging the upper plug 34.

As can be seen in Fig. 1, the screw lift 21 is suspended within the condensing chamber 10 on the end of the shaft 26. The upper portion of the body member 25 of the screw lift, on which the channel 22 is not formed, extends upwardly through an opening 43 in the roof of the condensing chamber. A tight seal between the condensing chamber and the body member 25 is insured by a packing gland 44 positioned within the roof opening 43. The size of the roof opening 43 if preferably such as to permit the screw lift 21 to be inserted into or removed from the condenser through this opening.

The drive shaft 26 is supported by two bearings 45 located above the condensing chamber 10. At least one, and preferably both, of the bearings 45 is a thrust bearing capable not only of supporting the weight of the screw lift 21 but also the weight of the molten zinc which is raised by the lift. The thrust bearings are secured to supporting elements 46 which are either suspended from above the condenser or are mounted on the floor about the condenser. In this way, the weight of the screw lift in operation, and any vibration associated with this operation, are not transmitted to the condenser structure. The drive shaft 26 is rotated by a pulley wheel 47, or the like, keyed to the upper end of the shaft.

In operation, the screw lift functions as follows. The lowermost end of the channel 22 is immersed in the body of molten zinc within the condensing chamber. When the channel is rotated about its axis, by rotation of the drive shaft 26, the channel functions as a screw lift and raises molten zinc therein. The shaft 26, and hence the channel 22, is rotated at a sufficient speed to cause centrifugal force to take over control of the molten zinc in the channel and to cause this molten zinc to overflow the open top of the channel throughout a substantial portion of its length. The molten zinc is thus thrown out of the channel through the screw lift retaining wall provided by the outer side wall of the channel and is hurled toward the side walls of the condensing chamber. The upward motion of the zinc being raised by the channel is also imparted to the molten metal thrown outwardly therefrom and causes the metal to be thrown in a generally outward and upward direction into the chamber. The molten metal is thrown from the channel throughout a substantial portion of its full length and thereby forms a continuous series of spiralling umbrella-like showers of molten zinc emanating from a plurality of points vertically distributed within the chamber. The molten metal thus thrown forcibly against the side walls of the chamber rebounds in all directions and effectively bathes the interior surfaces of the condenser with the molten metal thrown upwardly from the body of molten zinc in the bottom of the chamber.

The bathing of the inner surfaces of the condensing chamber by the relatively cool molten metal thrown thereagainst insures a cooling temperature substantially below the boiling point of zinc, but not below the melting point of zinc, on substantially all surfaces with which the incoming zinc vapor makes contact. The cooling effect of heat transfer through the walls of the condenser, whether effected solely by the atmospheric air outside the chamber or by water-cooled jackets, is imparted to the molten metal which is constantly bathing these walls, but the presence of this molten metal on the walls prevents the chilling of any zinc vapor within the chamber to a temperature below the melting point of zinc. The droplets of condensed zinc vapor are thus permitted adequate opportunity to coalesce, and this coalescence is promoted to an exceptional degree by the practically total pervasion of the chamber by molten zinc. The foregoing conditions insure rapid cooling of the incoming carbon monoxide and zinc vapor through the critical temperature zone in which the carbon monoxide tends to dissociate and thereby susbtantially preclude the development of an oxidizing atmosphere within the condensing chamber as the zinc vapor is cooled to its dew point. In this way, the zinc vapor is condensed into the form of a body of molten zinc with the production within the condensing chamber of not more than a negligible amount of blue powder. The vigorous agitating and scrubbing action of the omnipresent molten zinc tends to maintain the temperature in the condenser uniform and thus accelerates the condensation. In general, the condenser is operated so as to maintain an operating temperature of the order of 550° C. The exhaust gases leaving the condensing chamber at this relatively low temperature carry with them substantially only that amount of zinc corresponding to the partial pressure of zinc at this temperature.

The height to which molten zinc is raised by the screw lift before it is completely thrown off by centrifugal force depends largely upon the pitch of the channel-like screw and its speed of rotation. For example, with a 5-inch diameter screw, that is, with the shaft-like body member 25 of the screw 5 inches in diameter, molten zinc was found to be elevated to a height of about 18 inches when the screw was rotated at a speed of about 500 R. P. M. On the other hand, an 8-inch diameter screw of substantially identical pitch, when rotated at a speed of 300 R. P. M., raised the molten zinc to a height of 24 inches along the screw. Both channel-like screw lifts were of approximately standard pitch, that is, the pitch was substantially equal to the screw diameter. Screw lifts having a pitch greater or less than standard pitch may be used with advantage.

Figure 3:
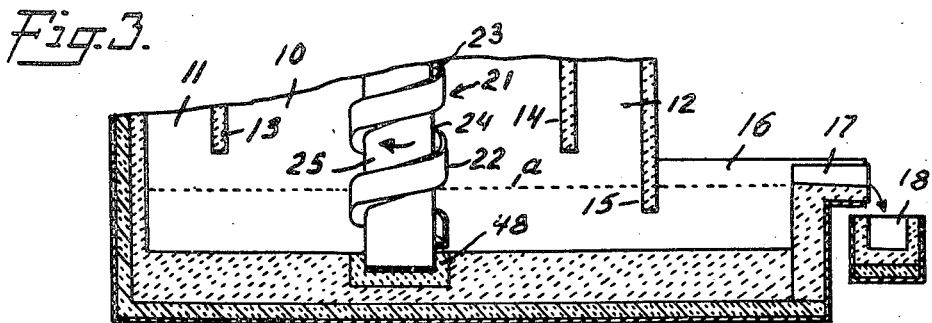
Fig. 3 is a longitudinal sectional elevation of the lower portion of another modification of the condenser.

The single spiral channel 22 shown in the drawings, although wholly effective, sets up a slight unbalance due to the scooping action of its lowermost end as it is moved through the molten zinc and tends to cause some vibration. Although this vibration is not prohibitive, it may be overcome by providing the shaft-like body portion of the screw lift with two similar spiral channels 180 degrees apart. Such a double channel is free of vibration and is extremely effective. In order to minimize vibration, the lower end of the shaft may be extended below the lowermost end of the channel so that it can be mounted in a suitable bearing 48 located in the floor of the condensing chamber as shown in Fig. 3.

The open-topped channel may be provided within the body of the screw lift rather than exteriorly thereof. Thus, instead of the channel 22 being formed as a spiral extending about the surface of its shaft-like body member, the channel may be machined in the form of a U-shaped groove 50 (Fig. 13) or a V-shaped groove 51 (Fig. 14) cut into the body member. In such case, the axis of the groove advantageously inclines downwardly and inwardly so that the outer side of the groove provides the desired retaining wall. The open top of such a groove provides the desired retaining wall opening which permits molten zinc raised by the rotating groove to be thrown outwardly into the interior of the condensing vessel.

Figure 2:
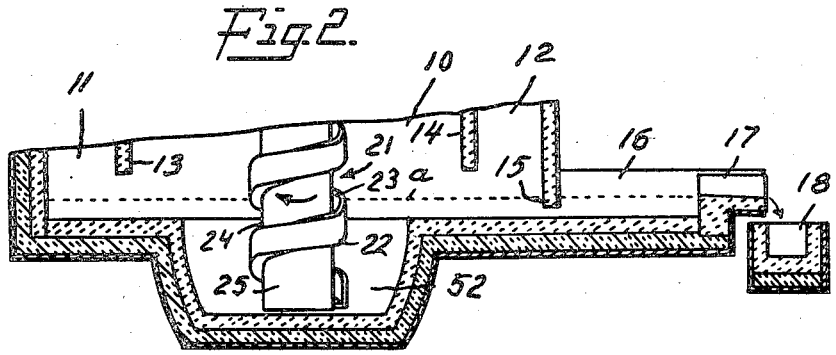
Fig. 2 is a longitudinal sectional elevation of the lower portion of a modified form of condensing chamber in accordance with the invention.

If it is desired to minimize the amount of molten zinc maintained in the bottom of the condensing chamber and yet insure an adequate amount of molten metal to be picked up by the screw lift, the bottom of the condensing chamber may be provided with a well 52, as shown in Fig. 2. Such a well provides a substantial depth of molten zinc in communication with the lower end of the screw lift without requiring this same depth of metal throughout the entire lower portion of the chamber. The screw lift in this modified form of our apparatus is so positioned as to extend close to the bottom of the well. If desired, the lower end of the lift may be mounted in a bearing similar to the bearing 48 shown in Fig. 3.

Additional cooling of the condenser may be provided by artificial cooling means. For example, a water-cooled shell may be positioned within the condensing chamber in the path of the incoming zinc vapor bearing gases as described in our co-pending application Serial No. 633,004, filed December 5, 1945, now Patent No. 2,457,004. This internal direct artificial cooling element is bathed by the molten zinc thrown into the condensing chamber by the screw lift and serves to withdraw heat both from the molten metal and from the incoming gases. The artifical cooling means may also comprise a bayonet-shaped water-cooled shell immersed in the molten zinc in the discharge well 16, as described in our co-pending application Serial No. 678,540, filed June 22, 1946, now Patent No. 2,457,548. In this latter type of direct artificial cooling, the cooling element withdraws heat from the molten metal in the discharge well. The violent agitation of the molten metal within the condensing chamber insures the flow of heat from the body of metal therein to the metal in the discharge well and prevents the existence of any objectionable temperature gradient therebetween.

In the zinc condensing apparatus shown in Figs. 1 and 7, the zinc vapor inlet and waste gas outlet are disposed substantially opposite one another on opposite end walls of the condensing chamber. The incoming zinc vapor flows under the depending baffle 13 and is given a whirling motion within the chamber by the rapidly rotating screw lift 21. The turbulence thus produced within the condensing chamber is sufficient to insure an adequate holding time for the zinc vapor to be completely condensed. The holding time may be increased by the arrangement of zinc vapor inlet and waste gas outlet shown in Figs. 8 and 9. It will be seen that in accordance with this arrangement the zinc vapor and exhaust gases are introduced into and removed from the condensing chamber adjacent opposite corners of a condensing chamber 10 having a substantially square cross-section. In still another form of zinc condenser in accordance with our invention, the condensing chamber 10 has a substantially cylindrical shape as shown in Fig. 10. The zinc vapor inlet 11 and exhaust gas outlet 12 are positioned adjacent one another but are separated from one another within the condensing chamber by means of a vertical baffle 53.

Although the zinc vapor inlet 11 and gas outlet 12 have been shown in Figs. 1 and 7 as being shielded by baffles, such baffles are not necessary where the inlet and outlet conduits are sufficiently inclined to insure the return flow into the condenser of any metal which may be thrown into these openings. Thus, as shown in Figs. 9 and 11, the vapor supply line 20 and the gas outlet 12 may be substantially vertical adjacent their connection to the condenser. Alternatively, the inlet or outlet, or both, may communicate with an obliquely but steeply inclined conduit, such as the supply line 20 shown in Fig. 12, which will insure the return flow of molten metal to the condenser.

The screw lift used in accordance with the present invention is not only highly effective in raising and throwing molten zinc into the condensing chamber but it is particularly dependable in operation. The lift extends into the condensing chamber through a single opening in the roof. The stuffing box positioned within the roof opening provides an effective air seal and prevents the formation of rock oxide about the shaft-like body portion of the lift where it enters the condensing chamber. The screw lift is thus substantially free from any tendency to bind or freeze during operation and may be operated continuously over an extended period of time without interruption. If, for any reason, it becomes necessary or desirable to remove the screw lift 21 from the condensing chamber, this can be done, in a matter of minutes under favorable conditions, by removing the packing gland 44 and withdrawing the lift through the condenser roof opening 43. The bearings which support the drive shaft 26, being located outside of the condensing chamber, are free from the deleterious effect of zinc vapors and high temperatures and are capable of sustained operation without any precautions other than normal lubrication.

This application is a division of our co-pending application Serial No. 14,286, filed March 11, 1948, now Patent No. 2,457,550.

We claim:

1. A condenser for zinc vapor comprising a closed vessel having a zinc vapor inlet and a gas outlet, a screw lift disposed vertically within the vessel and provided peripherally with a retaining wall capable of permitting radial discharge therefrom of molten zinc raised by the lift, the screw lift being adapted when rotated to raise molten zinc from a body thereof in communication with the lower end of the lift, and means for rotating the lift so as to raise molten zinc from said body thereof and throw the raised molten zinc radially outwardly away from the retaining wall into the vessel above the body of molten zinc therein.

2. A condenser for zinc vapor comprising a closed vessel having a zinc vapor inlet and a gas outlet, a screw lift disposed vertically within the vessel and provided peripherally with a retaining wall having an opening therein communicating with the interior of the vessel, the screw lift being adapted when rotated to raise molten zinc from a body thereof in communication with the lower end of the lift, and means for rotating the lift so as to raise molten zinc from said body thereof and throw the raised molten zinc radially outwardly away from the retaining wall into the vessel above the body of molten zinc therein.

3. A condenser for zinc vapor comprising a closed vessel having a zinc vapor inlet and a gas outlet, a rotatable open-topped channel spirally disposed about a substantially vertical axis within said vessel and adapted upon rotation to raise molten zinc from a body thereof in communication with the lower end of the channel, and means for rotating the channel so as to raise molten zinc from said body thereof and throw the raised molten zinc by centrifugal force away from the open top of the channel into the vessel above the body of molten zinc therein.

4. A condenser for zinc vapor comprising a closed vessel having a zinc vapor inlet and a gas outlet, a vertically disposed shaft rotatably mounted within said vessel and having on its outer cylindrical surface a spirally disposed channel adapted upon rotation of the shaft to raise molten zinc from a body thereof in communication with the lower end of the channel, and means for rotating the shaft so that the channel raises molten zinc from said body thereof and the raised molten zinc is thrown by centrifugal force away from the channel and into the vessel above the body of molten zinc therein.

5. A condenser for zinc vapor comprising a closed vessel having a zinc vapor inlet, a gas outlet and a well adapted to hold a body of molten zinc, a screw lift vertically disposed within the vessel and provided peripherally with a retaining wall having an opening therein communicating with the interior of the vessel, the screw lift being adapted when rotated to raise molten zinc from the body thereof in said well in communication with the lower end of the lift, and means for rotating the lift so as to raise molten zinc from said body thereof and throw the raised molten zinc radially outwardly away from the retaining wall into the vessel above the body of molten zinc therein.

6. A condenser for zinc vapor comprising a closed vessel having a zinc vapor inlet, a gas outlet, and a well adapted to hold a body of molten zinc, a vertically disposed shaft rotataby mounted within said vessel and having on its outer cylindrical surface a spirally disposed channel adapted upon rotation of the shaft to raise molten zinc from the body thereof in communication with the lower end of the channel, and means for rotating the shaft so that the channel raises molten zinc from said body thereof and the raised molten zinc is thrown by centrifugal force away from the channel and into the vessel above the body of molten zinc therein.

GEORGE T. MAHLER.
ERWIN C. HANDWERK.

No references cited.